July 8, 1958 C W. MUSSER ET AL 2,842,686
PIEZOELECTRIC GAGE
Filed March 3, 1954 2 Sheets-Sheet 2

INVENTORS
C WALTON MUSSER
LLOYD W. INSETTA
BY
W. E. Thibodeau, A. W. Dew
and H. J. Forman
ATTORNEYS.

United States Patent Office 2,842,686
Patented July 8, 1958

2,842,686

PIEZOELECTRIC GAGE

C Walton Musser and Lloyd W. Insetta, Philadelphia, Pa., assignors to the United States of America as represented by the Secretary of the Army Application March 3, 1954, Serial No. 413,974

4 Claims. (Cl. 310—8.7)

(Granted under Title 35, U. S. Code (1952), sec. 266)

The invention described herein may be manufactured and used by or for the Government for governmental purposes without payment of any royalties thereon.

This invention relates to electric gages and more particularly to piezoelectric gages of the type used to measure fluid pressure.

Heretofore, piezoelectric gages, also referred to herein as piezo gages, especially those gages used to measure gas pressures within gun barrels, have been extremely delicate and have had the tendency to malfunction in use. Some of these gages have been made with a thin plastic housing through which electrical conductors extend for attachment to connecting wires of measurement apparatus. Quite frequently these wires become shorted when used outdoors in inclement weather. As a result, the extreme sensitivity of these gages to operating conditions has often hampered the tests and experimentation to which they were applied.

It is therefore, an object of this invention to provide a piezoelectric gage which will overcome the aforementioned difficulties.

Another object of this invention is to provide a piezoelectric gage which is of simple but rugged construction and which may be readily assembled and disassembled without damage to the gage components.

A further object of this invention is to provide a piezoelectric gage which is efficient in operation and compactly assembled.

A still further object of this invention is to provide a piezoelectric gage which is unaffected by adverse operating conditions.

In furtherance of these objects, we have provided a piezoelectric gage within a rigid housing, the components being hermetically sealed within this housing. A pair of electrically-insulated leads extend through the housing for connection with an exterior connector assembly. The construction of the sealed unit is such as to provide both positive pressure response from the object being tested and positive electrical connection to the measuring equipment while sealed against adverse operating conditions.

Figure 1:
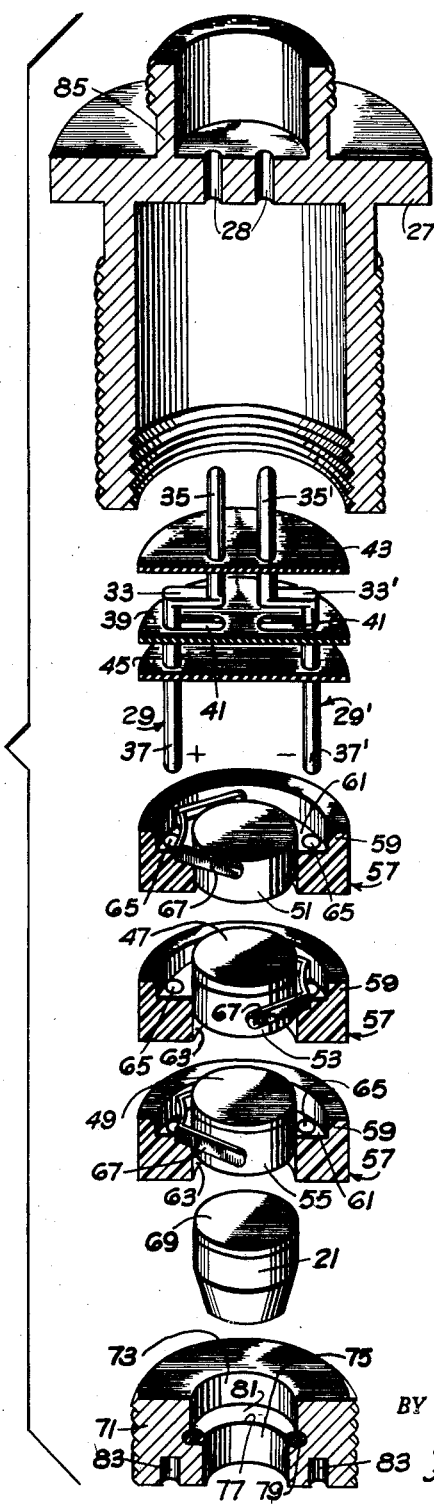
Figure 2:
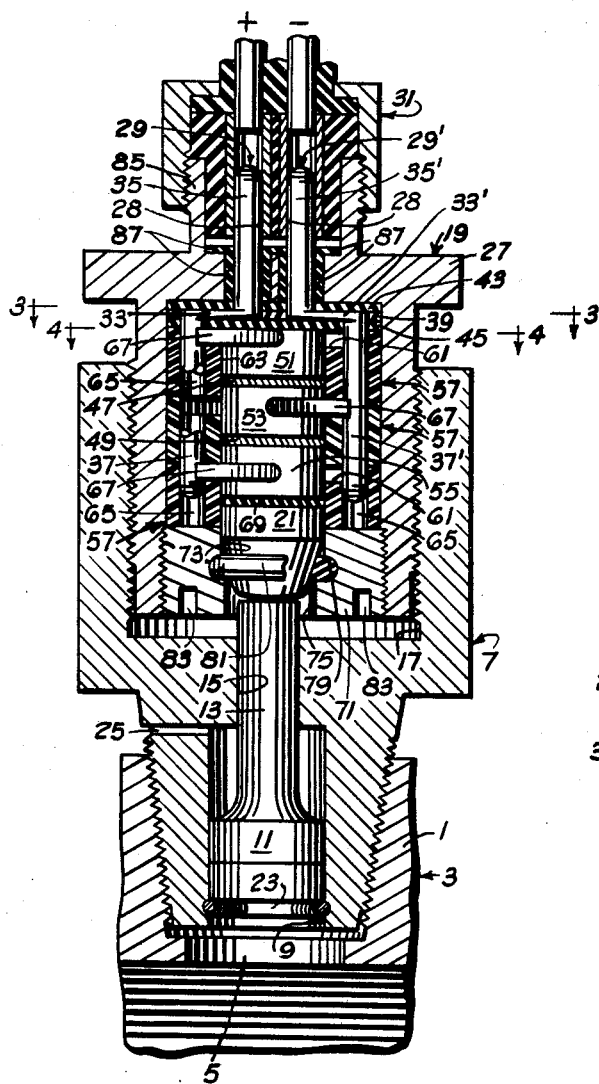
Figure 3:
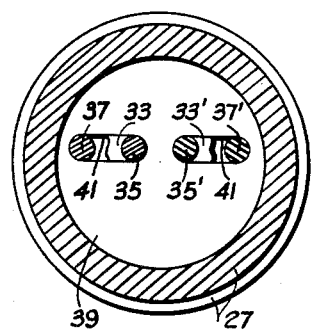
Figure 4:
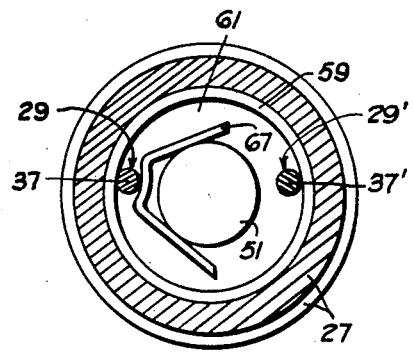

All of the foregoing, as well as other objects and advantages, will become apparent from a study of the following description, taken in conjunction with the accompanying drawings, wherein like characters of reference indicate corresponding parts throughout the several views and wherein:

Figure 1 is an exploded view of the instant piezo gage, in perspective and partly in section, showing the components thereof, Figure 2 is a central, longitudinal sectional view of the assembled piezoelectric gage, in conjunction with an adapter which is used to connect the unit to the side of a gun barrel, Figure 3 is a sectional view of the gage components alone, taken along line 3—3 of Figure 2, and with portions of the webs broken away, and Figure 4 is a sectional view, similar to Figure 3 but taken along line 4—4 of Figure 2.

By way of illustration, a piezoelectric gage of the type hereinafter described is shown in Figure 2 of the drawings in association with the interior of a gun barrel such that propellant gas pressures generated within the barrel may be directed to exert a force against a plurality of quartz crystals which, as well known to those persons skilled in the art, are operative to cause an electrical voltage to appear across the faces of each of the crystals in response to the directed force. By measuring the magnitude at this voltage by suitable measurement apparatus (not shown), it is possible to determine the pressure of the propellant gas.

The wall 1 of the gun barrel 3 is provided with a tapered opening or port 5 into which one end of a gage adapter assembly 7 is threaded. This end of the adapter is provided with a longitudinal bore 9 which is in communication with the interior of the barrel and which houses a piston 11. The stem 13 of the piston passes through a smaller bore 15 in the adapter which communicates with a chamber 17. The piezoelectric gage, generally designated by the reference numeral 19 is threaded into the chamber at the opposite end of the adapter. The bottom of the gage defines a cavity which houses a force transmitting member or anvil 21, into which the outer end of the stem 13 extends. The stem serves to transmit the force that is exerted against the piston by the gas pressure within the barrel of the gun, to the anvil of the gage. A lock ring 23, which is seated adjacent to one extremity of the bore 9, maintains the piston within the adapter 7. Communicating with the upper end of the bore 9 and with the atmosphere, is a vent 25 which prevents any air or gas from exerting a back pressure that would damp or reduce the upward movement of the piston; similarly, it prevents the formation of the partial vacuum which would damp or reduce downward movement of the piston.

The piezoelectric gage components are assembled within a rigid housing 27, as shown in Figure 2. Extending outwardly of the housing, through holes 28 in the top thereof, are a pair of crank-shaped contact or conductor pins 29, 29' of opposite polarity, which serve to electrically connect the pressure responsive elements of the gage by means of a threaded electric cable connector 31 to associated measurement apparatus (not shown). As viewed in Figure 1 of the drawings, the positive pin 29 and the negative pin 29', respectively, have a flat, lateral web 33, 33' which connects the upwardly extending pin portion 35, 35' to an offset, downwardly extending pin portion 37, 37'. An insulation wafer 39 has a pair of elongated slots 41 which accommodate the webs 33, 33' and recess them below the flat surfaces of the wafer. Overlying this wafer and the recessed webs is a second wafer 43 which has a pair of holes to accommodate and hold the upwardly extending portions 35, 35' of the pins in spaced relationship. Underlying the wafer 39 and the recessed webs of the pins is a third wafer 45 which has a pair of holes to accommodate and hold the more widely spaced, downwardly extending, portions of the pins in proper position. The second and third wafers function to sandwich the first wafer, together with the recessed webs 33, 33' therebetween.

The pressure responsive components of the gage include two quartz crystals 47, 49, each of which has a positive and a negative side. Three contact plates 51, 53, 55 are provided to conduct the electrical charge generated by the crystals in response to a mechanical force exerted against them in operation. The crystals are placed in engagement with the plates such that the negative side of each crystal 47, 49 is placed in contact with respective upper and lower surfaces of the centrally disposed contact plate 53. The upper contact plate 51 is thus disposed to abut the inner wafer 45 and to also engage the positive side of one crystal 47; and the lower contact plate 55 is disposed to engage the positive side of the other crystal 49. Of course, this particular arrangement is merely illustrative; the disposition of the parts, accordingly, may be reversed such that the positive side of each crystal is placed in contact with the respective upper and lower surfaces of the centrally disposed contact plate 53.

Encompassing the contact plates and crystals are three dielectric collars 57. Each of these collars comprises a disk with a recess in the top thereof, as defined by an upwardly directed peripheral flange 59. The recessed portion 61 of each collar is provided with an axial bore 63 of sufficient size to slidably accommodate the associated contact plate and crystals. Each collar is also provided with a pair of bores 65, which extend through the recessed portion at opposite sides of the axial bore 63 to slidably accommodate the contact pins 29, 29'. Positioned within the recess of each collar is a U-shaped contact clip 67 which engages an associated contact plate and one of the contact pins, in the manner shown in Figure 4. These clips conduct the current, generated by the crystals, from the contact plates to the contact pins. Since the upper and lower contact plates 51, 55 engage the positive sides of both crystals, the contact clips associated with these plates are placed in engagement with the positive contact pin 29; whereas the centrally disposed contact plate 53 engages the negative side of both crystals, the clip associated with this plate is placed in engagement with the negative contact pin 29'.

The anvil 21 of the gage also extends into and is centrally positioned by the axial bore 63 of the lowermost collar 57. The anvil transmits mechanical force to the lower contact plate 55 but is electrically insulated from the plate by means of a dielectric wafer 69. A threaded retainer plug 71, having an axial bore 73 extending partially therethrough to slidably accommodate the anvil, communicates with a smaller diameter axial bore 75 which extends through to the outermost end of the plug to accommodate the uppermost end of a force transmitting member such as the piston stem 13. The shoulder 77 which terminates the larger diameter bore 73, together with a peripheral groove 79, provides a seat in which a resilient ring gasket 81 is disposed. The retainer plug serves to maintain the gage in assembled relationship and provides a means whereby the force transmitting member may directly contact the anvil. In addition the resilient gasket produces a hermetic seal without the necessity of bringing excessive pressure to bear upon the components during assembly which might possibly crack or otherwise injure the sensitive crystals. Indentations 83 are provided in the bottom of the plug to receive a spanner tool which may be used to complete the assembly of the unit.

It will be noted, by reference to the drawings, that all of the holes in the housing, wafers and dielectric collars which accommodate the contact pins are in vertical alignment to facilitate assembly. Furthermore, in order to prevent improper connection to auxiliary apparatus, the holes are aligned off-center of the gage connector housing 85.

The entire gage may be assembled in the following manner. The uppermost insulation wafer 43 is placed in position within the gage housing with its holes in alignment with the holes in the top of the housing. The upper ends of the contact pins 29, 29' are inserted into these holes and are maintained in position by installing the slotted wafer 39 and the lowermost wafer 45. At this point in the assembly of the gage, insulation cement 87 is poured into the holes and voids around the contact pins to assure permanent positioning and insulation of the pins and insulation wafers, while additionally providing a hermetic seal for the upper end of the gage. This assembly can be facilitated by the use of an appropriate fixture (not shown) which will positively hold the contact elements and the wafers into place while the cement is applied and dried or polymerized. After the contact pins and insulation wafers are cemented in place, the uppermost contact plate 51 is placed in pressure responsive abutment with the underneath surface of the lowermost insulation wafer 45; this contact plate is positioned by a collar 57 in which a contact clip 67 is disposed. Since the positive side of the upper crystal 47 is to be placed in engagement with this plate, the contact clip is connected to the plate and the positive contact pin 29 as shown in Figure 4.

The positive side of the upper quartz crystal 47 is now placed in contact with the upper contact plate 51, through which the crystal is caused to react with the lowermost wafer 45 in response to actuation by the other pressure transmitting elements of the gage. The next contact plate 53 is then placed in engagement with the negative side of the crystal 47 and is positioned therein by means of a second collar 57 which accommodates a contact clip within its recessed portion 61. Since this plate engages the negative side of the upper crystal, its associated contact clip is connected to the negative contact pin 29' as shown in Figure 2. The negative side of the lower quartz crystal 49 is then placed in engagement with the lower surface of this contact plate. This leaves the positive side of the lower crystal ready to receive the bottom contact plate 55 which is thus placed in such engagement.

The bottom contact plate 55 is positioned by means of the bottom collar 57 which also has a contact clip recessed therein. Since this contact plate is connected to the positive side of the crystal 49, the contact clip 67 connects it to the positive contact pin 29, shown in Figure 2.

After the insulation wafer 69 is placed beneath the bottom contact plate 55, the anvil is placed in position within the bore 67 of the bottom collar 57. All of the gage components are then held in operative position, as shown in Figure 2, by the retainer plug 71 which contains the resilient gasket 81. The plug is threaded into the housing until the gasket snugly engages the anvil and the collars are arranged in a contiguous stack, thereby assuring the proper association of the parts and the hermetical sealing of the unit.

The gage is now ready for calibration, after which it may be used for pressure measurements in the manner illustrated in Figure 2, and as hereinbefore described. Those persons skilled in the art will readily appreciate the ease in which the gage is assembled and the simplicity with which the gage may be disassembled whenever the need may arise.

This gage provides a positive and a negative connection, neither of which is grounded, and can thus be used with a large variety of associated electronic equipment. It can be made useful to produce a negative, positive or push-pull pulse, which is of particular importance in those applications where the ground connection may be fluctuating or influenced by other associated electric equipment used in instrumentation or firing. Having no connection to ground is also of value where the instrumentation is at a distance from the apparatus under observation and the "ground" is subject to variation between the instrumentation and observation points due to stray fields or electric impulses.

It thus follows that many other and different arrangements may be used within the purview of this invention. It is to be understood, therefore, that the form of the invention herewith shown and described is to be taken as a preferred example of the same and that changes in the shape, size and arrangement of the parts may be resorted to without departing from the spirit of the invention. For example, the particular number and arrangement of crystals and contact plates may be varied to suit any particular requirement. It is, therefore, desired that the form disclosed be taken as illustrative and not as limiting. Furthermore, we do not wish the scope of this invention to be limited beyond the limitations which may be imposed by the following claims.

We claim:

1. A hermetically sealed piezoelectric gage comprising, in combination, a rigid housing having an opening at one end thereof; a contact pin assembly including a negative contact pin and a positive contact pin comprising inner portions confined within said housing, the terminal outer portions of said pins extending longitudinally outwardly of said housing through openings defined by said housing; means associated with said pins and said housing defining a hermetical seal therebetween; at least one electro-mechanical pressure responsive crystal having a negative and a positive side; a dielectric collar positioning said crystal within said housing, said collar having a recessed portion defining a pair of spaced openings in alignment with and slidably engaging the inner portions of said contact pins; means electrically connecting the negative side of said crystal to said negative pin; means electrically connecting the positive side of said crystal to said positive pin; closure means hermetically sealing said housing opening; and pressure transmitting means within said housing disposed in pressure transmitting association with said crystal and in communication with the exterior of said housing through a hermetically sealed opening in said closure means.

2. A piezoelectric gage as set forth in claim 1, wherein said terminal portions of said negative and positive contact pins are offset from the collar engaging inner portions thereof; a laterally extending web connecting the terminal portion and offset collar engaging portion of each of said pins; a first dielectric wafer defining elongated recesses for accommodating the lateral webs of said pins; a second dielectric wafer defining openings which accommodate the terminal portions of said pins; a third dielectric wafer defining openings which accommodate the inner portions of said control pins; said first wafer and said recessed webs being sandwiched between said second and third wafers, said third wafer, additionally, providing an abutment against which said crystal reacts in response to actuation by said pressure transmitting means.

3. In a piezoelectric gage, the combination of at least one electromechanical pressure responsive crystal, at least one crank-shaped electrical conductor in contact with each said crystal and including a longitudinal portion, an offset longitudinal portion, and a lateral web connecting said portions; a first dielectric wafer defining an elongated recess in which said lateral web is disposed; a second dielectric wafer defining an opening which accommodates said longitudinal conductor portion; a third dielectric wafer defining an opening which accommodates said offset conductor portion; whereby said first wafer and said recessed web are sandwiched between said second and third wafers.

4. A piezoelectric gage including a piezoelectric element having faces subject to voltages of opposite polarity when under pressure, first and second contact plates engaging the opposite faces of said element, means enclosing said element and said plates, a pair of output leads, a first U-shaped contact clip interconnecting the first of said plates and one of said leads, a second U-shaped contact clip interconnecting the second of said plates and the second of said leads, and means within said enclosing means for applying pressure to said element.

References Cited in the file of this patent

UNITED STATES PATENTS

| | | |
|---|---|---|
| 2,248,574 | Knight | July 8, 1941 |
| 2,250,496 | Postlethwaite | July 29, 1941 |
| 2,384,465 | Harrison | Sept. 11, 1945 |
| 2,413,462 | Massa | Dec. 31, 1946 |
| 2,479,264 | Rosenberg | Aug. 16, 1949 |
| 2,498,585 | Seiden | Feb. 21, 1950 |
| 2,644,045 | Herterick | June 30, 1953 |